United States Patent [19]

Kayashima

[11] Patent Number: 5,274,444
[45] Date of Patent: Dec. 28, 1993

[54] VIDEO SIGNAL PROCESSOR

[75] Inventor: Hiroshi Kayashima, Nagaokakyo, Japan

[73] Assignee: Mitsubishi Denki Kabushiki Kaisha, Tokyo, Japan

[21] Appl. No.: 27,593

[22] Filed: Mar. 5, 1993

Related U.S. Application Data

[63] Continuation of Ser. No. 821,814, Jan. 17, 1992, abandoned.

[30] Foreign Application Priority Data

Jan. 21, 1991 [JP] Japan .................................. 3-005342
Jun. 20, 1991 [JP] Japan .................................. 3-148383

[51] Int. Cl.$^5$ .............................................. H04N 11/02
[52] U.S. Cl. .................................. 358/138; 358/141
[58] Field of Search ............... 358/133, 136, 138, 140, 358/11, 141

[56] References Cited

U.S. PATENT DOCUMENTS

| | | | |
|---|---|---|---|
| 4,979,040 | 12/1990 | Masumoto | 358/138 |
| 5,018,010 | 5/1991 | Matsumoto | 358/136 |
| 5,128,759 | 7/1992 | Matsunaga | 358/136 X |
| 5,148,270 | 9/1992 | Someya | 358/141 X |

OTHER PUBLICATIONS

"An HDTV Broadcasting System Utilizing a Bandwidth Compression Technique-MUSE" IEEE Transactions on Broadcasting, vol. BC-33, No. 4, Dec. 1987.

Primary Examiner—Mark R. Powell

[57] ABSTRACT

A video signal processor for reproducing a MUSE signal in the form of a Hi-vision signal. In transmitting a Hi-vision television signal, a signal obtained by thinning out the complete group of sampling points which are extracted from the original Hi-vision video signal in accordance with a predetermined rule is transmitted. A video signal processor in a TV set completes sampling points which are thinned out on the transmission side by interpolation. In a conventional video signal processor, since it is necessary to process a signal at a digital portion at a high speed, the circuit must be composed of elements which operate at a high speed. It is also necessary to use a low-pass filter having a sharp cutoff characteristic in the process of cutting off the high-frequency component of the output signal. In the present invention, an input signal is first subjected to time base expansion and the horizontal frequency characteristic is adjusted by the high-pass filter and the band-rejection filter, thereby enabling signal processing at a comparatively low speed. Thus, a predetermined horizontal frequency characteristic is realized by a cheap low-pass filter. A color signal interpolated between fields is produced from the data interpolated between frames by passing the data interpolated between fields through a low-pass filter and a bandpass filter, and adding the respective outputs, thereby removing the vertical line disturbance due to the variation in the clamping level between fields which is a problem remaining unsolved in the related art.

7 Claims, 10 Drawing Sheets

VIDEO SIGNAL PROCESSOR

This application is a continuation of application Ser. No. 07/821,814 filed on Jan. 17, 1992, now abandoned.

BACKGROUND OF THE INVENTION

1. Field of the Invention

The present invention relates to a video signal processor and, more particularly, to a video signal processor for reproducing a MUSE (Multiple Sub-Nyquist Sampling Encoding) signal received by a television set of a MUSE system as the original Hi-vision (high-definition) signal.

2. Description of the Related Art

Development of Hi-vision (high-definition television) broadcasting is also in progress in Japan and has already reached the stage of practical use. In order to transmit Hi-vision signals, what is called a MUSE (Multiple Sub-Nyquist Sampling Encoding) system is adopted.

A frequency band for Hi-vision signals is about five times of the frequency band for signals of an NTSC system. In order to transmit Hi-vision signals as they are, a signal frequency band of about 20 to 25 MHz is necessary. However, since the bandwidth of radio waves which is practically usable has a limitation, it is impossible to transmit the signals in such a wide frequency band on a radio wave as they are for broadcasting. It is therefore necessary to compress the bandwidth of a Hi-vision signal.

The MUSE system is a broadcasting system which has been developed in order to broadcast by transmitting Hi-vision signals from a satellite through one channel. In the MUSE system, basebandwidth compression is realized by a comparatively simple system without impairing the picture quality of television. In the MUSE system, the frequency of a baseband signal containing a brightness signal having a bandwidth of 22 MHz and a color signal having a bandwidth of 7 MHz is modulated and this baseband signal is transmitted through one channel having a frequency of 27 MHz, which is a bandwidth allotted to the satellite broadcasting in Japan. In the case of adopting a frequency modulation system as a modulation system for signals, since it is necessary to allow for adequate frequency deviation, the bandwidth of a transmission signal must be compressed to about ⅓ of the bandwidth of a radio wave. In the MUSE system, the bandwidth of the baseband signal is compressed to about 8.1 MHz.

The bandwidth compression in the MUSE system is carried out by thinning out the complete group of sampling points which are extracted from the original Hi-vision signal by an encoder on the transmission side in accordance with a predetermined rule. The thinning-out of the sampling points is carried out by utilizing a physiological characteristic of a television viewer. That is, by utilizing the physiological characteristic of the viewer that the resolution in an oblique direction is lowered than that in a horizontal or vertical direction, interfield offset sampling is carried out. The physiological characteristic of the viewer is also utilized that in the area in which the image is moving, the deterioration of the picture quality is not so conspicuous to the viewer even if the resolution is slightly lowered.

A decoder on the reception side fills up the sampling points taken out by the encoder on the transmission side by what is called interpolation. That is, the sampling points actually supplied from the encoder are received and the sampling points taken out are reproduced on the basis of the groups of the sampling points therebefore and thereafter and inserted into the vacant portions.

FIG. 11 is a block diagram of a general structure of a conventional video signal processor. In FIG. 11, a conventional video signal processor is composed of input terminals 11 to 13, an inverse matrix circuit 14, a high-pass filter 15, a color signal interpolator 16, adders 17 to 19, a gamma correcting portion 21, a time base expander 23, a digital/analog (D/A) converting portion 25, low-pass filters (LPF) 26 to 28, and output terminals 31 to 33.

Among the input terminals 11 to 13, the input terminal 11 is a Y signal input terminal to which a digital brightness signal (Y signal) is input, the input terminal 12 is an R-Y signal input terminal to which a digital color difference signal (R-Y signal) is input and the input terminal 13 is a B-Y signal input terminal to which a digital color difference signal (B-Y signal) is input. The Y signal input terminal 11 is directly connected to the inverse matrix circuit 14 and the high-pass filter 15. The R-Y signal input terminal 12 and the B-Y signal input terminal 13 are connected to the inverse matrix circuit through the color signal interpolator 16.

R, G and B signals output from the inverse matrix circuit 14 are input to the adders 17 to 19, respectively. The adders 17 to 19 add the respective outputs of the inverse matrix circuit 14 to the output of the high-pass filter 15. The outputs of the adders 17 to 19 are connected to the time base expander 23 through the gamma correctors 21-1 to 21-3, respectively, of the gamma correcting portion 21. The R, G and B signals which are subjected to time base expansion by use of the time base expander 23 are converted to analog R, B and G signals, respectively, by D/A converters 25-1 to 25-3 of the digital/analog converting portion 25. The R, B and G signals converted by the D/A converters 25-1 to 25-3 are output from the output terminals 31 to 33 through the low-pass filters 26 to 28, respectively.

The operation of a conventional video signal processor having the above-described structure will now be explained. The Y signal which are decoded from the MUSE signal and having a propagation rate of 48.6 Mbps is input to the Y signal input terminal 11. Similarly, the R-Y signal and B-Y signal having a propagation rate of 16.2 Mbps are input to the R-Y signal input terminal 12 and the B-Y signal input terminal 13, respectively. The Y signal is input to the high-pass filter 15 and the high-frequency component thereof is extracted in accordance with the transfer characteristic represented by the following equation (1):

$$H0(Z0^{-1}) = k[1 - (Z0^{-1} + Z0)/2] \qquad (1)$$

wherein Z0 is a function of a horizontal frequency f represented by the following equation (2):

$$Z0 = \exp(j2\pi f/f0) \qquad (2)$$

wherein k is a positive constant and f0 is 48.6 MHz.

The color signal interpolator 16 to which the R-Y signal and the B-Y signal are input from the input terminals 12 and 13, respectively, interpolates the respective signals and outputs the R-Y signal and the B-Y signal each having a propagation rate of 16.2 Mbps in the form of the R-Y signal and the B-Y signal each having a propagation rate of 48.6 Mbps. The inverse matrix circuit 14 calculates the Y signal input from the Y signal input terminal 11 and the R-Y signal and the B-Y signal each having a propagation rate of 48.6 Mbps and output from the color signal interpolator 16 in accordance with the following equation (3) and outputs the R, G and B signals each having a propagation rate of 48.6 Mbps.

$$\begin{pmatrix} R \\ G \\ B \end{pmatrix} = \begin{pmatrix} 1 & 1 & 0 \\ 1 & -1/2 & -1/4 \\ 1 & 0 & 5/4 \end{pmatrix} \begin{pmatrix} Y \\ R-Y \\ B-Y \end{pmatrix} \quad (3)$$

The high-frequency component of the Y signal having a propagation rate of 48.6 Mbps which is extracted by the high-pass filter 15 is added to the R, G and B signals having a propagation rate of 48.6 Mbps which are output from the inverse matrix circuit 14 by the adders 17 to 19. The R, G and B signals having a propagation rate of 48.6 Mbps with the contours corrected are thus output from the adders 17 to 19. The R, G and B signals output from the adders 17 to 19 are subjected to gamma correction by use of the gamma correctors 21-1 to 21-3. The gamma correction portion 21 outputs the R, G and B signals having a propagation rate of 48.6 Mbps with the contours and the gamma corrected. The R, G and B signals are input to the time base expander 23.

The time base expander 23 expands the time base of the signals to 12/11 which are transmitted from a transmitter with the time base compressed to 11/12. The R, G and B signals having a propagation rate of 48.6 Mbps are converted into the R, G and B signals having a propagation rate of 44.5 Mbps by the time base expander 23 and input to the D/A converting portion 25.

The digital R, G and B signals input to the D/A converting portion 25 are converted into analog signals by the D/A converters 25-1 to 25-3. The R, G and B signals converted into analog signals are input to the low-pass filters 26 to 28. The low-pass filters 26 to 28 pass only the horizontal frequencies in a low frequency band of the analog R, G and B signals while limiting the higher cutoff frequencies, thereby removing the aliasing noise component. The output characteristic of the thus-reproduced signal is expressed by the hatched portion in FIG. 4.

In this way, the analog R, G and B signals reproduced are output from the output terminals 31 to 33, respectively.

FIG. 12 is a block diagram of a general structure of a conventional color signal interpolator. The conventional color signal interpolator is composed of an interframe interpolated data input terminal 34, a field memory 35, a line memory 36, a first selector 37, a second selector 38 and an interframe interpolated data output terminal 39. Data on the color signal which is supplied to the color signal interpolator and interpolated between frames in the MUSE system is input to the interframe interpolated data input terminal 34. The color signal output from the interframe interpolated data output terminal 34 is input to the field memory 35, which delays the color signal by one field before outputting it to the line memory 36. The line memory 36 delays the output signal of the field memory by one line and outputs it to the first selector 37. The first selector 37 inputs the output signal of the field memory 35 and the output signal of the line memory 36 and outputs them to the second selector 38 alternately with a period of one field. The second selector 38 alternately outputs the output signal from the interframe interpolated data input terminal 34 and the output signal from the first selector 37 with a period of a frequency F which is equivalent to half of the period of the interframe interpolated data. The interframe interpolated data output terminal 39 leads the signal output from the second selector 38 to the outside of the color signal interpolator as a color signal interpolated between fields.

The operation of the conventional color signal interpolator having the above-described structure will now be explained.

FIG. 13 is an explanatory view of the sampling patterns for processing the color signals for a still picture in the MUSE system. As shown in FIG. 13, since two kinds of color signal are transmitted line sequentially in the MUSE system, each of the color signals are thinned out on every other line.

In FIG. 13, if the intervals T1, T2 and T3 between the represented by the marks ○ and Δ, and ● and ▲ are represented by frequencies, T1 is equivalent to F1=16.2 (MHz), T2 is equivalent to F2=8.1 (MHz) and T3 is equivalent to F3=4.05 (MHz). F1 is equal to the frequency F which corresponds to half of the period of the interframe interpolated data.

Under the above-described conditions, the data rate of the original transmitted signal is F3 and the sampling points of the transmission signal are offset at an interval of T2 on every other line, namely, in every frame. The sampling points of the transmission signal are also offset at an interval of T1 in every field, so that the sampling points are restored to the original in four fields.

The signal supplied to the interframe interpolated data input terminals 34 is a signal reproduced by inserting the signal transmitted one frame before between the sampling points of a transmitted signal. The data rate of the signal is T2. The signal supplied to the interframe interpolated data input terminals 34 is composed of ○ and Δ or ● and ▲ shown in FIG. 13. The field memory 35 delays the signal supplied to the interframe interpolated data input terminal 34 by the time equivalent to 562 horizontal scanning (hereinunder referred to as "H") periods, namely, one field. The line memory 36 delays the output signal of the filed memory 35 by the time equivalent to 1 H period, namely one line.

It is obvious from FIG. 13 that if the signal supplied to the interframe interpolated data input terminal 34 is composed of ○ and Δ, in other words, the current field is a first field or a third field, the signal on the closest line to the signal supplied to the interframe interpolated data input terminal 34 among the signals composed of ● and ▲ and transmitted one field before is the signal transmitted 563 H before.

Therefore, if the output signal of the line memory 36 is selected by the first selector 37 and the signal supplied to the interframe interpolated data input terminal 34 is changed over to the output signal of the first selector 37 at a rate of F1, namely, the frequency F which is equivalent to half the period of the interframe interpolated data, the signal composed of ○ and Δ with the closest ● and ▲ inserted therebetween is obtained at the output of the second selector 38 as the color signal interpolated between fields.

Similarly it is obvious from FIG. 13 that if the signal supplied to the interframe interpolated data input terminal 34 is composed of ● and ▲, in other words, the current field is a second field or a fourth field, the signal on the closest line to the signal supplied to the interframe interpolated data input terminal 34 among the signals composed of ○ and △ and transmitted one field before is the signal transmitted 562 H before.

Therefore, if the output signal of the field memory 35 is selected by the first selector 37 and the signal supplied to the interframe interpolated data input terminal 34 is changed over to the output signal of the first selector 37 at a rate of T1, namely, the frequency F which is equivalent to half the period of the interframe interpolated data by the second selector 38, the signal composed of ● and ▲ with the closest ○ and △ inserted therebetween is obtained at the output of the second selector 38 as the color signal interpolated between fields.

In this way, interfield interpolated data is obtained at the interfield interpolated data output terminal 39 for leading the output of the second selector 38 at a data rate of a frequency of F, which is equivalent to half the period of the interframe interpolated data, namely, a period of T1. The interfield interpolated data output to the interfield interpolated data output terminal 39 is shown in FIG. 14.

In the conventional video signal processor having the above-described structure, it is necessary to process a signal at a digital portion at a high speed. In order to process a digital signal at a high speed, a large load is applied to the hardware. It is therefore necessary that the conventional video signal processor is composed of elements which operate at a high speed. It is also necessary to use a low-pass filter having a sharp cutoff characteristic in the process of cutting off the high-frequency component of the output signal after the D/A conversion. Since such elements which operate at a high speed and a low-pass filter having a sharp cutoff frequency are generally expensive, it is difficult to reduce the cost of the circuit as a whole in the conventional video signal processor.

The conventional color signal interpolator suffers from a problem of vertical line disturbance due to the variation in the clamping level. If there is a deviation of a direct current level of the signal of ● and ▲ which corresponds to the signal of ○ and △ in the output signal interpolated between fields such as that shown in FIG. 14, a vertical line disturbance at a rate which corresponds to the period of T1 is caused. In order to prevent this, the variation in the clamping level between fields is hardly permitted. Under such restriction, good processing of color signals for a still picture is impossible.

SUMMARY OF THE INVENTION

Accordingly, it is a first object of the present invention to eliminate the above-described problems in the related art and to provide a video signal processor which lightens the load of the hardware by reducing the signal processing speed at a digital portion.

It is a second object of the present invention to provide a video signal processor which is capable of realizing the necessary cutoff characteristic without using an expensive filter having a sharp cutoff characteristic.

It is a third object of the present invention to provide a video signal processor which is capable of preventing vertical line disturbance even there is a variation in the clamping level between fields by removing the disturbing component by a combination of filters.

To achieve this aim, in a first aspect of the present invention, there is provided a video signal processor comprising:

(a) a time base expander for expanding the time bases of a digital brightness signal and two kinds of digital color difference signal transmitted with the time bases compressed on the transmission side to the original rate;

(b) a color signal interpolator for converting the sampling rates of the two kinds of color difference signal with the time bases expanded by the time base expander to a predetermined multiple;

(c) an inverse matrix circuit for calculating the two kinds of color difference signal output from the color signal interpolator and the brightness signal with the time base expanded by the time base expander in the form of a matrix and outputting R, G and B signals;

(d) a high-pass filter for extracting the high-frequency component of the brightness signal with the time base expanded by the time base expander;

(e) adders for adding the output of the high-pass filter to the R, G and B signals, respectively, which are output from the inverse matrix circuit;

(f) a gamma corrector for imparting a gamma characteristic to the respective outputs of the adders; and (g) a digital/analog converter for converting the R, G and B signals output from the gamma correctors to analog signals.

In a second aspect of the present invention, there is provided a video signal processor comprising:

(a) a high-pass filter for extracting a high-frequency component of a digital brightness signal transmitted with the time base compressed on the transmission side;

(b) a color signal interpolator for converting the sampling rates of two kinds of digital color difference signal with the time bases compressed on the transmission side to a predetermined multiple;

(c) an inverse matrix circuit for calculating the two outputs output from the color signal interpolator and the digital brightness signal in the form of a matrix and outputting R, G and B signals; (d) adders for adding the output of the high-pass filter to the R, G and B signals, respectively, which are output from the inverse matrix circuit;

(e) band-rejection filters for limiting the bands of the respective outputs of the adders;

(f) a gamma corrector for imparting a gamma characteristic to the respective outputs of the band rejection filters;

(g) a time base expander for expanding the time bases of the outputs of the gamma correctors at the respectively predetermined rates;

(h) a digital/analog converter for converting the outputs of the time base expander to analog signals; and (i) low-pass filters for extracting the respective low-frequency components from the outputs of the digital analog converter.

In a third aspect of the present invention, there is provided a video signal processor comprising:

(a) a time base expander for expanding the time bases of a digital brightness signal and two kinds of digital color difference signal transmitted with the time bases compressed on the transmission side to the original rate;

(b) a color signal interpolator for converting the sampling rates of the two kinds of color difference signal with the time bases expanded by the time base expander to a predetermined multiple;

(c) an inverse matrix circuit for calculating the two kinds of color difference signal output from the color signal interpolator and the brightness signal with the time base expanded by the time base expander in the form of a matrix and outputting R, G and B signals;

(d) a high-pass filter for extracting the high-frequency component of the brightness signal with the time base expanded by the time base expander;

(e) adders for adding the output of the high-pass filter to the R, G and B signals, respectively, which are output from the inverse matrix circuit;

(f) band-rejection filters for limiting the bands of the respective outputs of the adders;

(g) a gamma corrector for imparting a gamma characteristic to the respective outputs of the band-rejection filters;

(h) a digital/analog converter for converting the respective outputs of the gamma correctors to analog signals; and (i) low-pass filters for extracting the respective low-frequency components from the outputs of the digital analog converter.

In a fourth aspect of the present invention, there is provided a color signal interpolator comprising:

(a) an inputting means for inputting line sequential color signals interpolated between frames as interframe interpolated data;

(b) a first delaying means for delaying the color signal output from the inputting means by the time which is equivalent to one field;

(c) a second delaying means for delaying the output of the first delaying means by the time which is equivalent to one line;

(d) a first selector means for taking out the output of the first delaying means and the output of the second delaying means alternately at a period of one field;

(e) a second selector means for taking out the interframe interpolated data output from the inputting means and the output of the first selector means alternately at a frequency F having a period equivalent to the half of the period of the interframe interpolated data;

(f) a low-pass filter means for removing the frequency component which is half of the frequency F of the output signal of the second selector means;

(g) a bandpass filter means for transmitting the frequencies of the outputs of the low-pass filter other than the frequency component having half of the frequency F;

(h) an adder for adding the outputs of the low-pass filter means and the bandpass filter means; and (i) an outputting means for outputting the output of the adder as a color signal converted into interfield interpolated data.

According to a video signal processor of the present invention, various digital signal processings are enabled by subjecting an input signal to time base expansion.

According to a video signal processor of the present invention, a sharp cutoff characteristic is further obtained by adjusting the horizontal frequency characteristic of the output signal by using a high-pass filter and a low-pass filter.

In addition, by subjecting an input signal first to time base expansion, a video signal processor of the present invention is capable of various digital processings at a lower speed, and further by adjusting the horizontal frequency characteristic of the output signal by using a high-pass filter and a low-pass filter, a sharp cutoff characteristic is obtained.

According to a color signal interpolator of the present invention, it is possible to reproduce a color signal as interfield interpolated data with the disturbance component removed therefrom by removing the frequency component having half of the frequency F of a color signal interpolated between fields by a low-pass filter means from the color signal, transmitting the other frequencies of the output signal of the low-pass filter means through a bandpass filter means, and adding the signals output from the low-pass filter means and the bandpass filter means.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of a video signal processor according to the present invention will be explained with reference to the accompanying drawings.

First Embodiment

Figure 1:
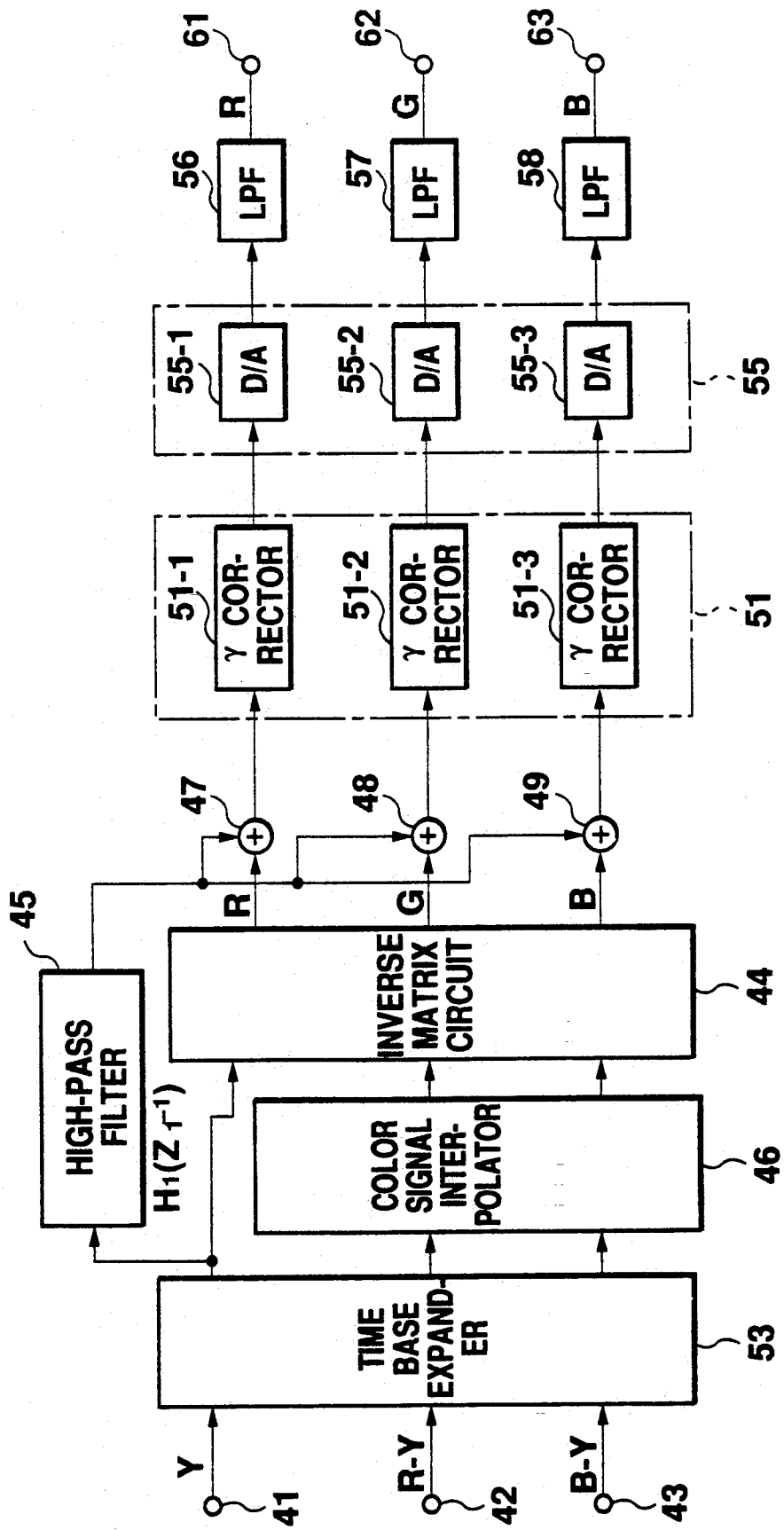
FIG. 1 is a block diagram of the circuit structure of a first embodiment of a video signal processor according to the present invention.

FIG. 1 is a block diagram of the structure of a first embodiment of a video signal processor according to the present invention.

In FIG. 1, a first embodiment of a video signal processor is composed of a Y signal input terminal 41, an R-Y signal input terminal 42, a B-Y signal input terminal 43, an inverse matrix circuit 44, a high-pass filter 45, a color signal interpolator 46, adders 47 to 49, a gamma correcting portion 51, a time base expander 53, a digital/analog (D/A) converting portion 55, low-pass filters 56 to 58 and output terminals 61 to 63.

Figure 11:
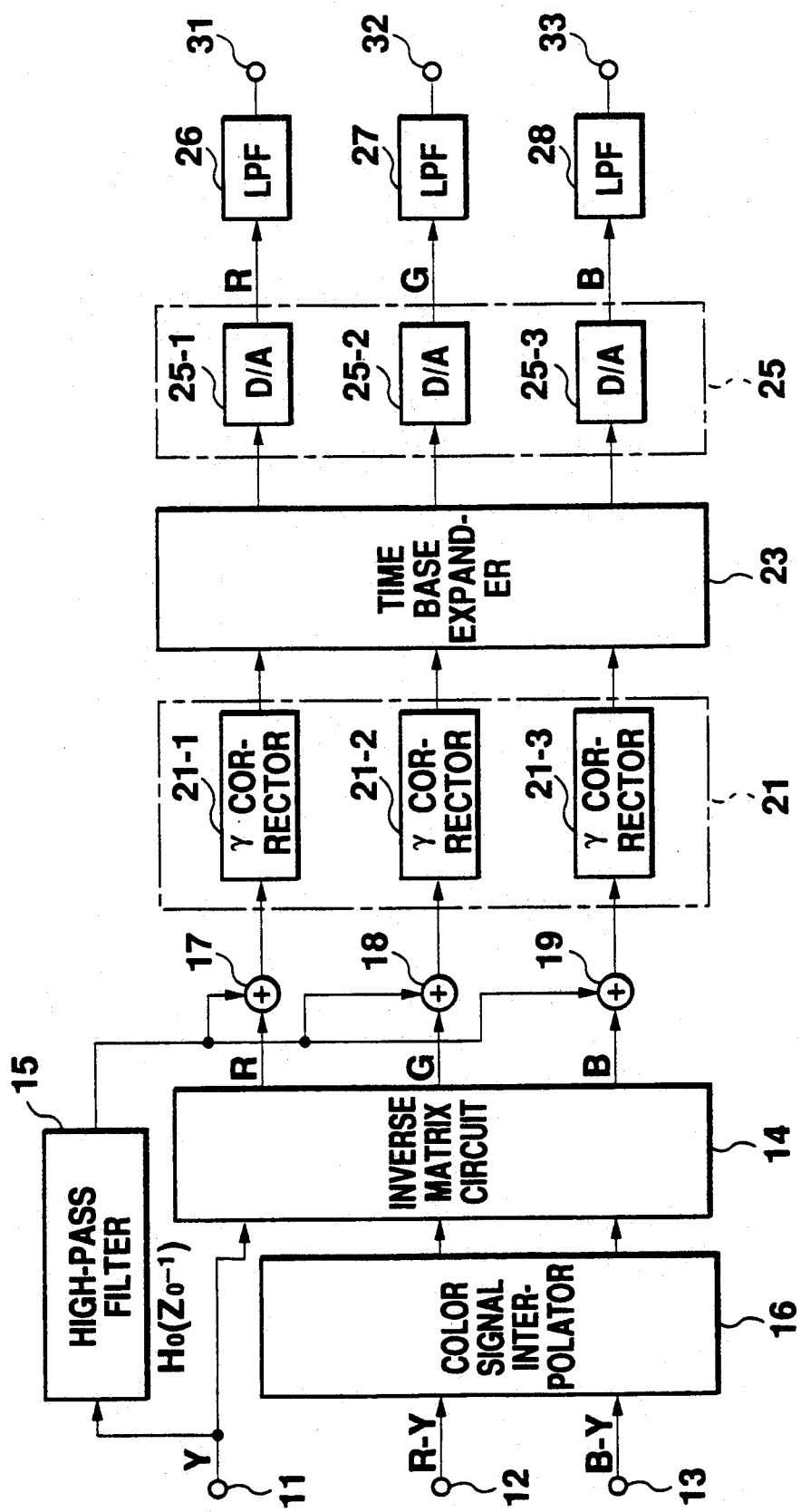
FIG. 11 is a block diagram of a conventional video signal processor.
Figure 12:
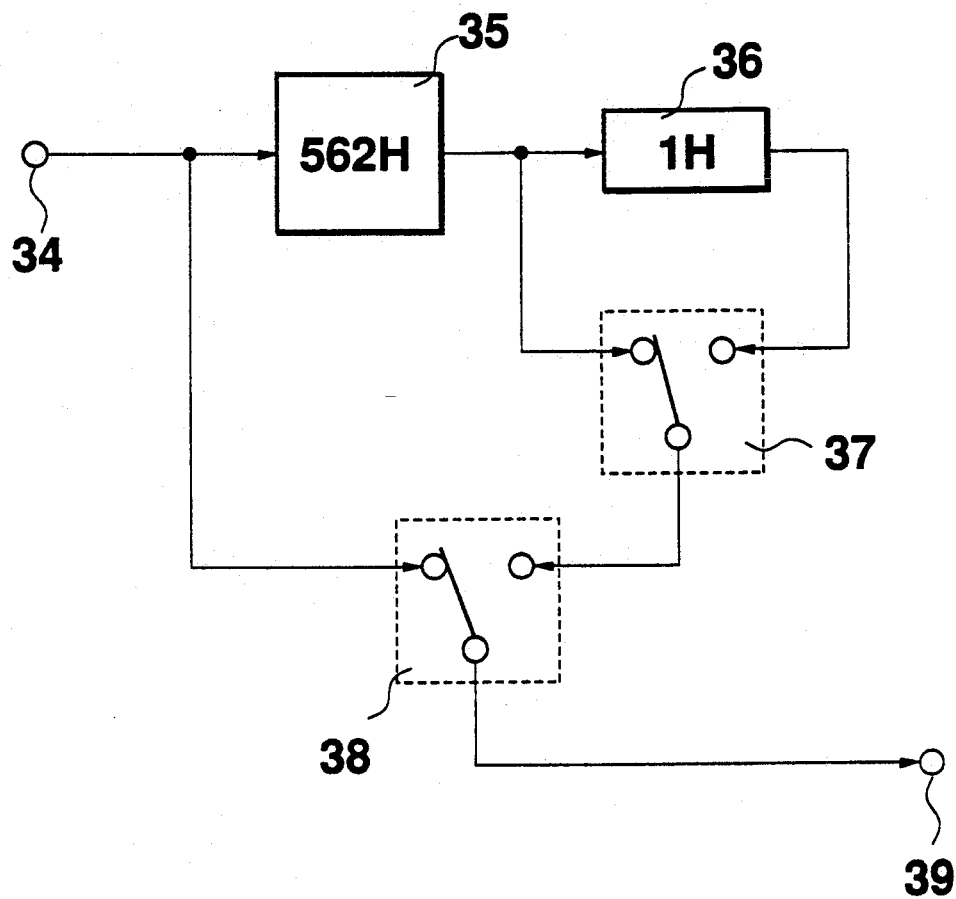
FIG. 12 is a block diagram of a conventional color signal processor.
Figure 13:
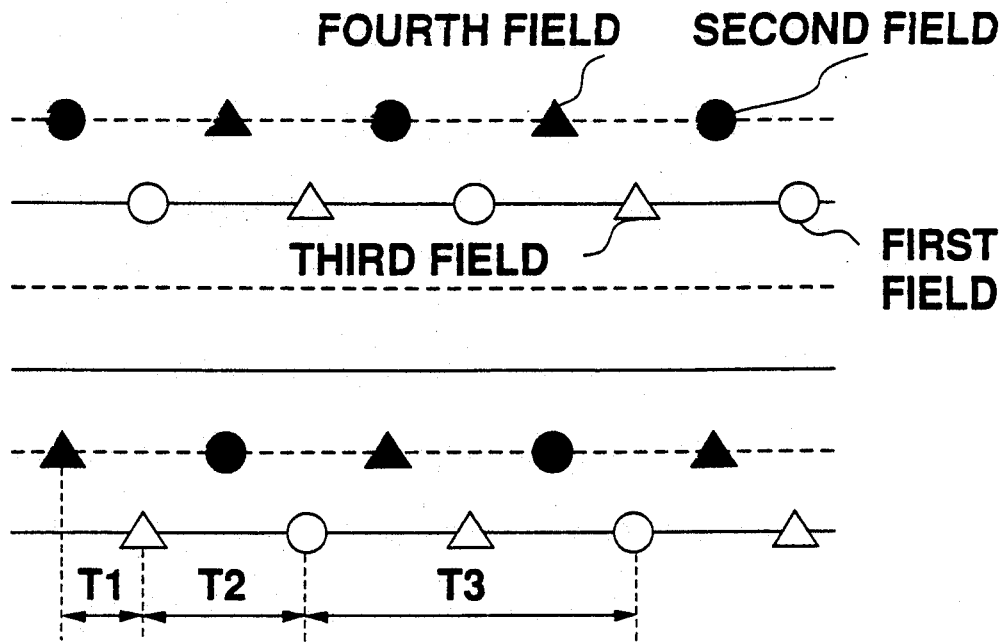
FIG. 13 is an explanatory view of a color signal interpolated between frames in a MUSE system.

In the first embodiment, a Y signal, an R-Y signal and B-Y signal output from the input terminals 41 to 43 are first input to the time base expander 53. The Y signal output from the time base expander 53 is branched into two portions so as to be input to the high-pass filter 45 and the inverse matrix circuit 44, respectively. The R-Y signal and the B-Y signal are input to the color signal interpolator 46. The output signals of gamma correctors 51-1 to 51-3 are directly input to D/A converters 55-1 to 55-3. Since the other structure is the same as the conventional video signal processor shown in FIG. 11, explanation thereof will be omitted.

The operation of the first embodiment of a video signal processor having the above-described structure will now be explained. The Y signal having a propagation rate of 48.6 Mbps and the R-Y signal and the B-Y signal having a propagation rate of 16.2 Mbps which are decoded from MUSE signals are input to the time base expander 53 through the Y signal input terminal 41, the R-Y signal input terminal 42 and the B-Y signal input terminal 43, respectively. The time base expander 53 expands to 12/11 the time base of a signal which is transmitted with the time base compressed to 11/12 by a transmitter. The Y signal having a propagation rate of 48.6 Mbps is converted to the Y signal having a propagation rate of 44.55 Mbps by the time base expander 53 and input to the high-pass filter 45 and inverse matrix circuit 44. The R-Y signal and the B-Y signal having a propagation rate of 16.2 Mbps are converted to the R-Y signal and the B-Y signal, respectively, having a propagation rate of 14.85 Mbps by the time base expander 53 and input to the color signal interpolator 46.

The Y signal having a propagation rate of 44.5 Mbps with the time base expanded by the time base expander 53 is input to the high-pass filter 45 and the high-frequency component is extracted in accordance with the transfer characteristic represented by the following equation (4):

$$H1(Z1^{-1}) = k[1-(Z1^{-1}+Z1)/2] \quad (4)$$

wherein Z1 is a function of a horizontal frequency f represented by the following equation (5):

$$Z1 = \exp(j2\pi f/f0) \quad (5)$$

wherein k is a positive constant and f1 is 44.55 MHz.

The color signal interpolator 46 to which the R-Y signal and the B-Y signal each having a propagation rate of 14.85 Mbps are input interpolates the respective signals and outputs the R-Y signal and the B-Y signal each having a propagation rate of 44.55 Mbps. The inverse matrix circuit 44 calculates the Y signal input from the time base expander 53 and the R-Y signal and the B-Y signal which have a propagation rate of 44.55 Mbps and which are output from the color signal interpolator 46 in accordance with the equation (3), and outputs the R, G and B signals each having a propagation rate of 44.55 Mbps. The equation (3) has already been explained in the related art.

The high-frequency component of the Y signal having a propagation rate of 44.55 Mbps which is extracted by the high-pass filter 45 is added to the R, G and B signals having a propagation rate of 44.55 Mbps which are output from the inverse matrix circuit 44 by the adders 47 to 49. The R, G and B signals having a progation speed of 44.55 Mbps with the contours corrected are thus output from the adders 47 to 49. The R, G and B signals output from the adders 47 to 49 are subjected to gamma correction in correspondence with the characteristic of the cathode ray tube by use of the gamma correctors 51-1 to 51-3. The gamma correcting portion 51 outputs the R, G and B signals having a propagation rate of 44.55 Mbps with the contours and the gamma corrected.

Figure 4:
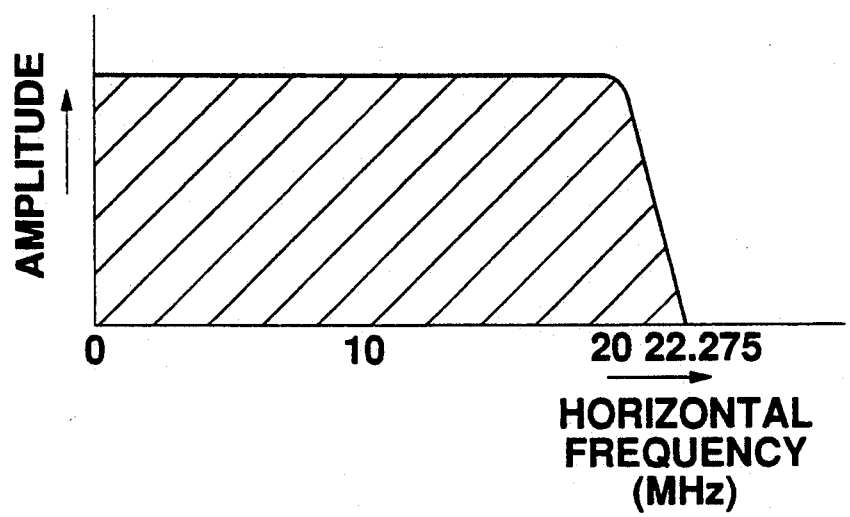
FIG. 4 is an explanatory view of the horizontal frequency characteristic of an output signal.

The R, G and B signals having a propagation rate of 44.55 Mbps and output from the gamma correcting portion 51 are input to the D/A converting portion 55. The digital R, G and B signals input to the D/A converting portion 55 are converted into analog signals by the D/A converters 55-1 to 55-3. The signals output from the D/A converters 55-1 to 55-3 are input to the low-pass filters 56 to 58, respectively. The low-pass filters 56 to 58 pass only the horizontal frequencies in a low frequency band of the analog R, G and B signals while limiting the higher cutoff frequencies, thereby removing the aliasing noise component. The output characteristic of the thus-reproduced signal is expressed by the hatched portion in FIG. 4.

In this way, the analog reproduced signals R, G and B are output from the output terminals 61 to 63, respectively.

As described above, in the first embodiment, since the input signals, Y, R-Y and B-Y are first subjected to time base expansion and then various digital signal processings, signal processing is possible at a lower speed than in the related art.

Second Embodiment

Figure 2:
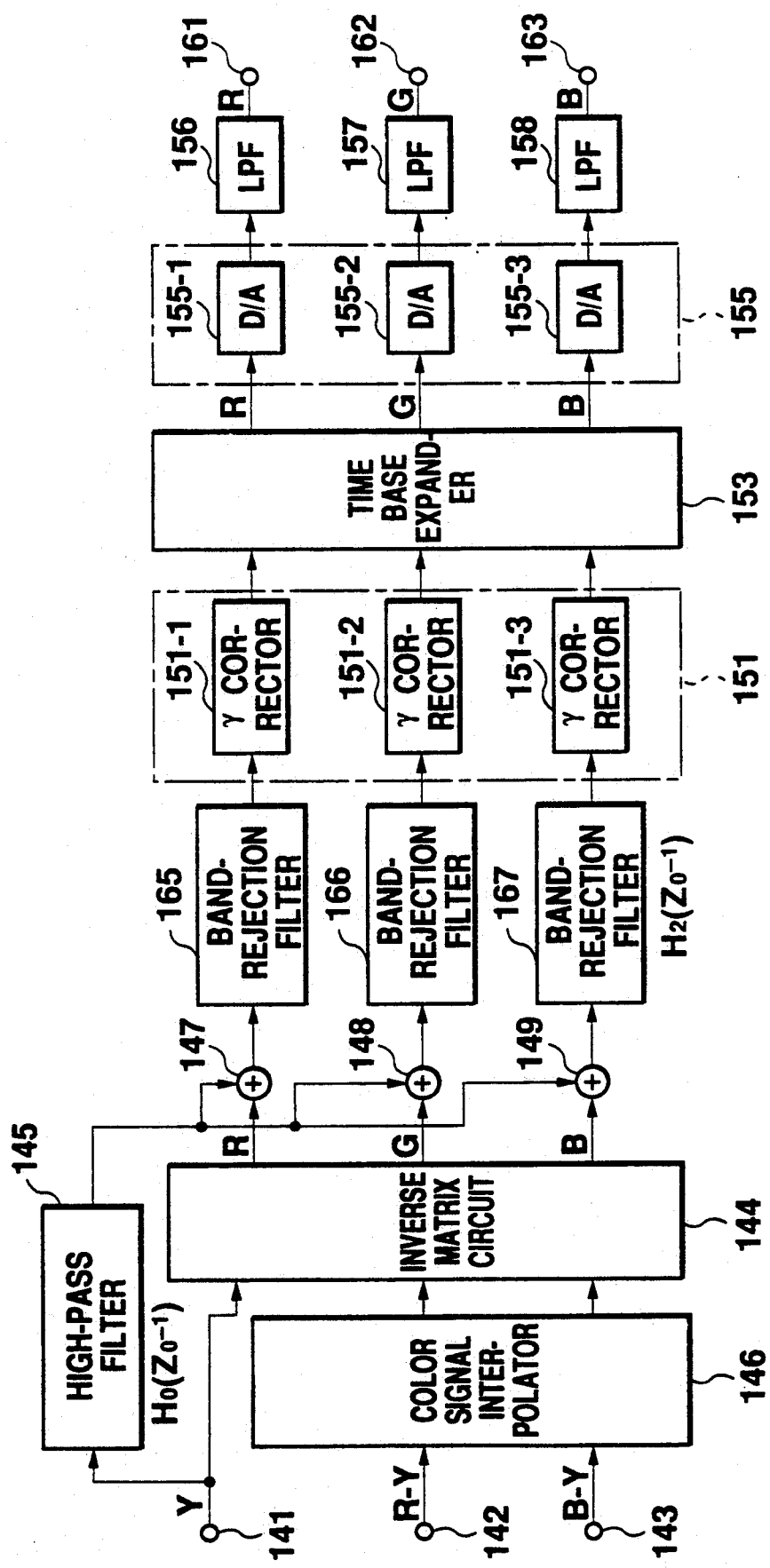
FIG. 2 is a block diagram of the circuit structure of a second embodiment of a video signal processor according to the present invention.

FIG. 2 is a block diagram of the structure of a second embodiment of a video signal processor according to the present invention.

In FIG. 2, a second embodiment of a video signal processor is composed of input terminals 141 to 142, an inverse matrix circuit 144, a high-pass filter 145, a color signal interpolator 146, adders 147 to 149, a gamma correcting portion 151, a time base expander 153, a digital/analog (D/A) converting portion 155, low-pass filters 156 to 158, output terminals 161 to 163 and band-rejection filters 165 to 167.

The band-rejection filters 165 to 167 are connected between the adders 147 to 149 and gamma correctors 151-1 to 151-3.

The operation of the second embodiment having the above-described structure will be explained. Since the operation of the second embodiment from the Y signal input terminal 141, the R-Y signal input terminal 142 and the B-Y signal input terminal 143 to the adders 147 to 149 are the same as that of the conventional video signal processor shown in FIG. 11, explanation thereof will be omitted.

In the second embodiment, the R, G and B signals having a propagation rate of 48.6 Mbps with the contours corrected and output from the adders 147 to 149, respectively, are input to the band-rejection filters 165 to 167, respectively.

Figure 5:
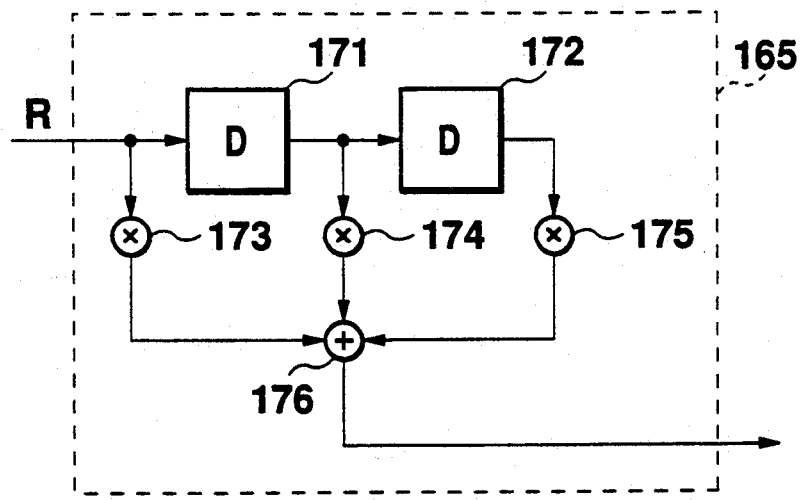
FIG. 5 is a block diagram of the detailed structure of the band-rejection filter of the second and the third embodiments of a video signal processor according to the present invention.

FIG. 5 is a block diagram of the detailed structure of the band-rejection filter 165. The band-rejection filters 166 and 167 have the same structure as the band-rejection filter 165.

In FIG. 5, the band-rejection filter 165 is composed of delay circuits 171, 172, multipliers 173 to 175 and an adder 176.

As is obvious from FIG. 5, the band-rejection filter 165 is provided with the first and second delay circuits 171, 172, which are connected with each other in series with respect to the input. The R signal input from the adder 147 shown in FIG. 2 to the first delay circuit 171 is branched so as to be input to the first multiplier 173. The output of the first delay circuit 171 is branched into two portions so as to be connected to the second delay circuit 172 and the second multiplier 174. The output of the second delay circuit 172 is connected to the third multiplier 175. The outputs of these three multipliers 173 to 175 are connected to the adder 176, and the output of the adder 176 are connected to the gamma corrector 151-1 shown in FIG. 2.

The R signal having a propagation rate of 48.6 Mbps with the contour corrected, as explained in the first embodiment, is input from the adder 147 to the band-rejection filter 165 having the above-described structure. The R signal output from the adder 147 is input to the first delay circuit 171 so as to be delayed by one clock pulse. The R signal output from the adder is also input to the first multiplier 173 so as to be multiplied by $\frac{1}{4}$ and output to the adder 176.

The R signal delayed by one clock pulse by the first delay circuit 171 is input to the second delay circuit 172 and the second multiplier 174. The second multiplier 174 multiplies the delayed signal by $\frac{1}{2}$ and outputs the product to the adder 176. The second delay circuit 172 further delays the delayed signal from the first delay circuit 171 by another one clock pulse and outputs the delayed signal to the third multiplier 175. The third multiplier multiplies the delayed signal by $\frac{1}{4}$ and inputs the product to the adder 176.

The adder 176 adds the outputs of the first to third multipliers 173 to 175. The transfer characteristic of the band-rejection filter 165 is thus represented by the following equation:

$$H2(Z0^{-1}) = \tfrac{1}{2} + (Z0^{-1} + Z0)/4 \qquad (6)$$

From the equations (1) and (6), the transfer characteristic of the output of the inverse matrix circuit 144 to the output of the band-rejection filter 165 is represented by the following equation (7):

$$H3(Z0^{-1}) = [1 + H0\,(Z0^{-1})] \cdot H2\,(Z0^{-1}) \qquad (7)$$

The following equations (8) and (9) are introduced from the equations (1), (2) and (6):

$$|H0(Z0^{-1})| = (k/2)\sin^2(\pi f/f0) \qquad (8)$$

$$|H2(Z0^{-1})| = \cos^2(\pi f/f0) \qquad (9)$$

The following equation (10) is introduced from the equations (7) to (9):

$$|H3(Z0^{-1})| = [1 + (k/2)\sin^2(\pi f/f0)] \cdot \cos^2(\pi f/f0) \qquad (10)$$

The R, G and B signals filtered in accordance with the transfer characteristic represented by the equation (10) and output from the band-rejection filters 165 to 167, respectively, are subjected to gamma correction in correspondence with the characteristic of the cathode ray tube by use of the gamma correctors 151-1 to 151-3 and to time base expansion by use of the time base expander 153.

The output of the time base expander 153 is represented by the following equation (11) because the data rate of the output is changed:

$$|H4(Z1^{-1})| = [1 + (k/2)\sin^2(\pi f/f1)] \cdot \cos^2(\pi f/f1) \qquad (11)$$

wherein Z1 is represented by the following equation (12) and the horizontal frequency f1 is 44.5 MHz:

$$S1 = \exp(j2\pi f/f1) \qquad (12)$$

The digital R, G and B signals having a frequency of 44.55 MHz and output from the time base expander 153 are converted into analog signals by the D/A converting portion 155 and input to the low-pass filters 156 to 158. The low-pass filters pass only the horizontal frequencies in a low frequency band of the analog R, G and B signals while limiting the higher cutoff frequencies, as indicated by the hatched portion in FIG. 4, thereby removing the aliasing noise components. In this case, it is clear from the equations (11) and (12) that it is possible to impart the characteristic close to that represented by the hatched portion in FIG. 4 to the signal output from the D/A converting portion 155 by appropriately selecting the value k in the horizontal frequency range of 0 to 22.275 MHz. It is therefore unnecessary that the low-pass filters 156 to 158 have a sharp cutoff characteristic. In this way, the analog R, G, B signals are output from the output terminals 161 to 163, respectively, in a well reproduced state.

As described above, in the second embodiment of a video signal processor, since the horizontal frequency characteristic of an output signal is adjusted by the high-pass filter and the band-rejection filter, a predetermined horizontal frequency characteristic is realized by a cheap low-pass filter without using an expensive low-pass filter having a sharp cutoff frequency.

Third Embodiment

Figure 3:
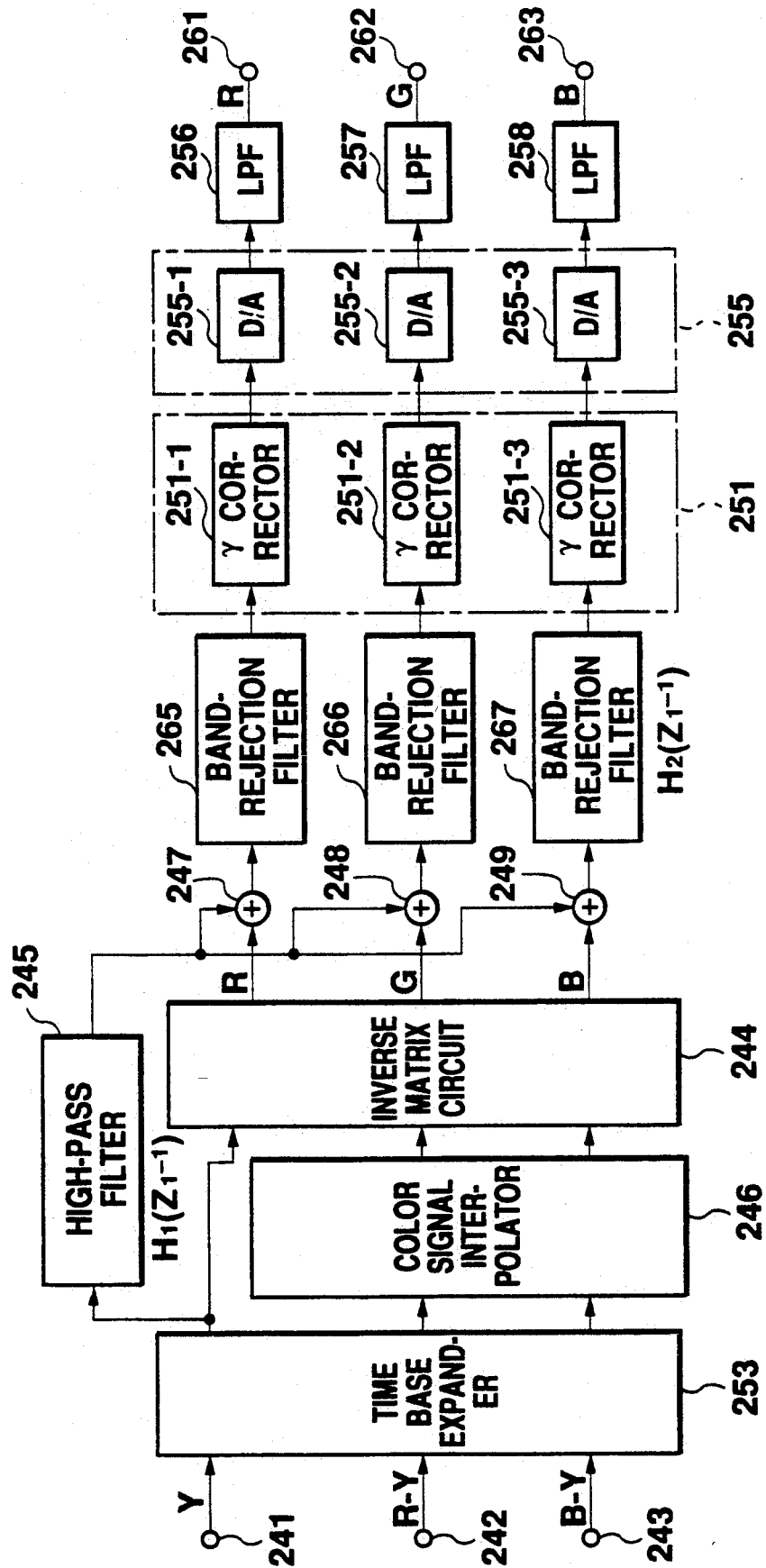
FIG. 3 is a block diagram of the circuit structure of a third embodiment of a video signal processor according to the present invention.

FIG. 3 is a block diagram of a third embodiment of a video signal processor according to the present invention.

In FIG. 3, a third embodiment of a video signal processor is composed of input terminals 241 to 243, an inverse matrix circuit 244, a high-pass filter 245, a color signal interpolator 246, adders 247 to 249, gamma correcting portion 251, a time base expander 253, a digital/analog (D/A) converting portion 255, low-pass filters 256 to 258, output terminals 261 to 263 and band-rejection filters 265 to 267.

As is clear from FIG. 3, in the third embodiment, the time base expander 253 is provided in the stage immediate after the input terminals 241 to 243 as in the first embodiment shown in FIG. 1.

The operation of the third embodiment of a video signal processor having the above-described structure will now be explained. The Y signal having a propagation rate of 48.6 Mbps and the R-Y signal and the B-Y signal having a propagation rate of 16.2 Mbps which are decoded from a MUSE signal are input to the time base expander 253 through the Y signal input terminal 241, the R-Y signal input terminal 242 and the B-Y signal input terminal 243, respectively. The time base expander 253 expands the time base of a signal to 11/12 which is transmitted with the time base compressed by a transmitter to 12/11. The Y signal having a propagation rate of 48.6 Mbps is converted to the Y signal having a propagation rate of 44.55 Mbps by the time base expander 253 and input to the high-pass filter 245 and inverse matrix circuit 244. The R-Y signal and the B-Y signal having a propagation rate of 16.2 Mbps are converted to the R-Y signal and the B-Y signal, respectively, having a propagation rate of 14.85 Mbps by the time base expander 253 and input to the color signal interpolator 246.

The Y signal having a propagation rate of 44.5 Mbps with the time base expanded by the time base expander 253 is input to the high-pass filter 245 and the high-frequency component is extracted in accordance with the transfer characteristic represented by the following equation (13), which is the same as that represented by the equation (4):

$$H1(Z1^{-1}) = k[1 - (Z1^{-1} + Z1)/2] \tag{13}$$

The color signal interpolator 246 interpolates the respective signals and outputs the R-Y signal and the B-Y signal each having a propagation rate of 44.55 Mbps. The inverse matrix circuit 244 calculates the Y signal input from the time base expander 253 and the R-Y signal and the B-Y signal which have a propagation rate of 44.55 Mbps and which are output from the color signal interpolator 246 in accordance with the equation (3), and outputs the R, G and B signals each having a propagation rate of 44.55 Mbps. The high-frequency component of the Y signal having a propagation rate of 44.55 Mbps which is extracted by the high-pass filter 245 is added to the R, G and B signals having a propagation rate of 44.55 Mbps which are output from the inverse matrix circuit 244 by the adders 247 to 249. The R, G and B signals having a propagation rate of 44.55 Mbps with the contours corrected are thus output from the adders 247 to 249 and input to the band-rejection filters 265 to 267.

The band-rejection filters 265 to 267 execute a similar operation to that of the band-rejection filters 165 to 167 in the second embodiment. The transfer characteristic of the band-rejection filter 265 is represented by the following equation (14):

$$H2(Z1^{-1}) = \frac{1}{2} + (Z1^{-1} + Z1)/4 \tag{14}$$

From the equations (1) and (13) and the equations (6) and (14), the transfer characteristic of the output of the inverse matrix circuit 244 to the output of the band-rejection filter 265 turns out to be the same as that represented by the equation (11) in the second embodiment.

The R, G and B signals filtered in accordance with the transfer characteristic represented by the equation (11) and output from the band-rejection filters 265 to 267, respectively, are subjected to gamma correction in correspondence with the characteristic of the cathode ray tube by use of the gamma correctors 251-1 to 251-3. The gamma correction portion 251 outputs the R, G and B signals having a propagation rate of 44.55 Mbps with the contours and the gamma corrected.

The R, G and B signals having a propagation rate of 44.55 Mbps and output from the gamma correcting portion 251 are input to the D/A converting portion 255. The digital R, G and B signals input to the D/A converting portion 255 are converted into analog signals by the D/A converters 255-1 to 255-3. The low-pass filters 256 to 258 pass only the horizontal frequencies in a low frequency band of the analog R, G and B signals while limiting the higher cutoff frequencies, thereby removing the aliasing noise components. The output characteristic of the thus-reproduced signal is expressed by the hatched portion in FIG. 4.

In this way, the analog reproduced signals R, G and B are output from the output terminals 261 to 263, respectively.

As described above, in the third embodiment, the input signals, Y, R-Y and B-Y are first subjected to time base expansion and then the horizontal frequency characteristics thereof are adjusted by the high-pass filter and the low-pass filters. The third embodiment of a video signal processor therefore enables digital signal processing at a lower speed than in the related art and does not require an expensive low-pass filter having a sharp cutoff characteristic. It is possible to realize a predetermined horizontal frequency characteristic by using cheap low-pass filters.

The advantages of these embodiments will be collectively described in the following.

According to the first embodiment, since an input signal is first subjected to time base expansion and then various digital signal processings, signal processing is possible at a lower speed than in the related art. It is therefore possible to lighten the load of the hardware.

According to the second embodiment, since the horizontal frequency characteristic of an output signal is adjusted by the high-pass filter and the band-rejection filter, a predetermined horizontal frequency characteristic is realized by a cheap low-pass filter without using an expensive low-pass filter having a sharp cutoff frequency. It is therefore possible to reduce the cost.

According to the third embodiment, the input signals are first subjected to time base expansion and then the horizontal frequency characteristics thereof are adjusted by the high-pass filter and the low-pass filters. The third embodiment of a video signal processor therefore enables digital signal processing at a lower speed than in the related art and does not require an expensive low-pass filter having a sharp cutoff characteristic. It is possible to realize a predetermined horizontal frequency characteristic by using cheap low-pass filters. Thus, both the lightening of the load of the hardware and the reduction in cost are achieved.

Fourth Embodiment

Figure 6:
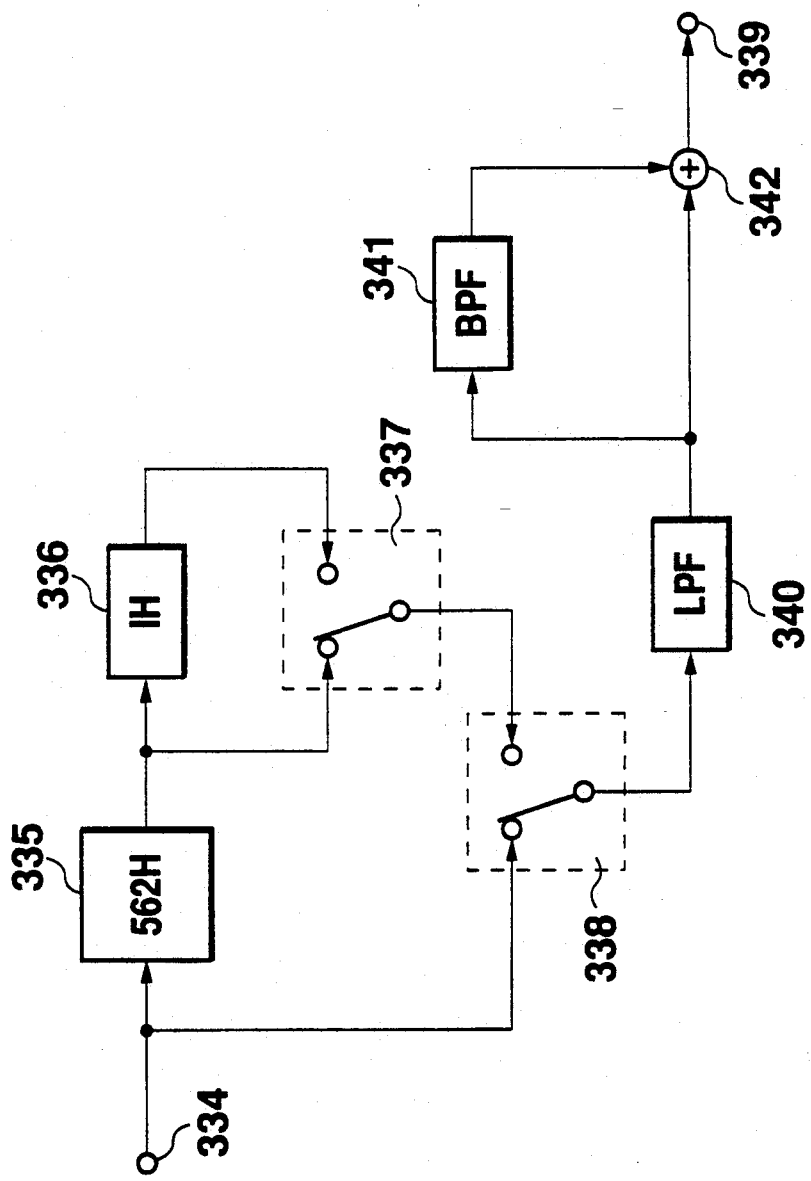
FIG. 6 is a block diagram of the structure of a color signal interpolator provided as a fourth embodiment of the present invention.

A color signal interpolator of the present invention will now be explained. FIG. 6 is a block diagram of a color signal interpolator as a fourth embodiment of the present invention.

In FIG. 6, an embodiment of a color signal interpolator of the present invention is composed of an interframe data interpolated data input terminal 334, a field memory 335, a line memory 336, a first selector 337, a second selector 338, an interfield interpolated data output terminal 339, a low-pass filter 340, a bandpass filter 341 and an adder 42.

Data on the color signal which is supplied to the color signal interpolator and interpolated between frames in the MUSE system is input to the interframe interpolated data input terminal 334. The field memory 35 inputs a color signal which has arrived in the interframe interpolated data input terminal 334 and delays the color signal by one field before outputting it to the line memory 336. The line memory 336 delays the output signal of the field memory by one line and outputs it to the first selector 337. The first selector 337 inputs the output signal of the field memory 335 and the output signal of the line memory 336 and outputs them to the second selector 338 alternately with a period of one field. The second selector 338 changes the output signal from the interframe interpolated data input terminal 334 over to the output signal from the first selector 337 with a period of a frequency F which is equivalent to the half of the period of the interframe interpolated data. The low-pass filter 340 inputs the output signal of the second selector 338 and filters the input signal so as to transmit only the low-frequency component. The bandpass filter 341 filters the output signal of the low-pass filter 340 so as to transmit a predetermined band. The adder 342 inputs and adds the output signal of the low-pass filter 340 and the output signal of the bandpass filter 341 and outputs a color signal interpolated between fields. The interfield interpolated data output terminal 339 leads the signal output from the adder 342 to the outside of the color signal interpolator as the color signal interpolated between fields.

Figure 14:
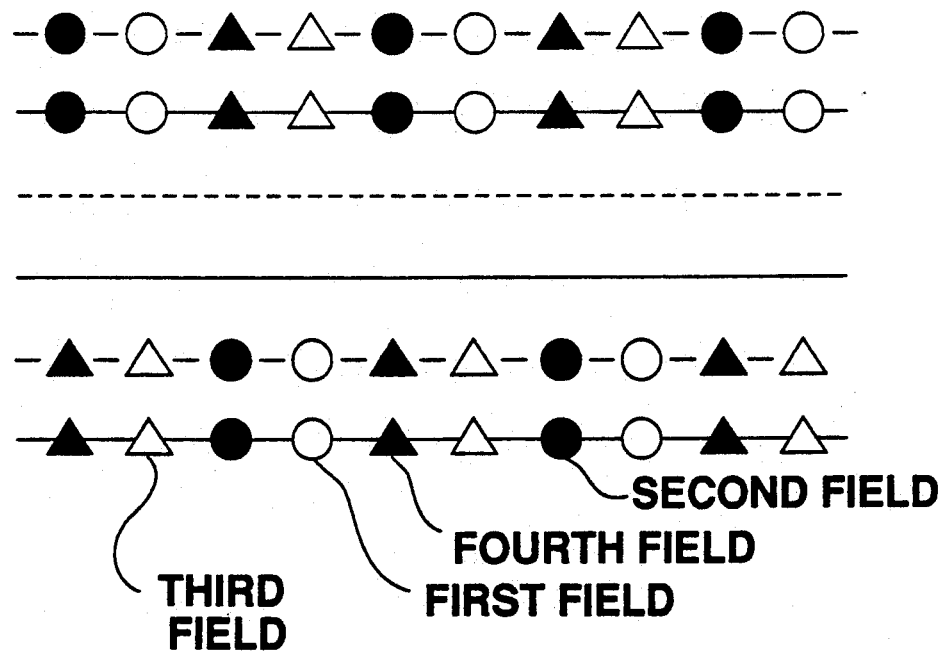
FIG. 14 is an explanatory view of a color signal interpolated between fields in a MUSE system.

The operation of the embodiment of a color signal interpolator having the above-described structure will now be explained. The second selector 338 changes the signal which has arrived at the interframe interpolated data input terminal 334 over to the output signal of the first selector 337. The output signal of the second selector 338 is basically the data corresponding to the color signal interpolated between fields and the period of the data is T1 shown in FIG. 14. The period of the color signal interpolated between fields corresponds to the data rate of the frequency F, which is equivalent to half of the period of the input data interpolated between frames.

If there is a variation in the clamping level between fields, a difference in the direct current level is caused between the signal of ○ and △ and the signal of ● and ▲. The difference in the direct current level causes a strain at a rate of a period of T1, thereby producing vertical line disturbance. Since the vertical lines are produced at a rate of the period T1, if the component having twice the period T1, namely, the frequency component having half the frequency F is cut off, it is possible to suppress almost all the vertical lines.

Figure 7:
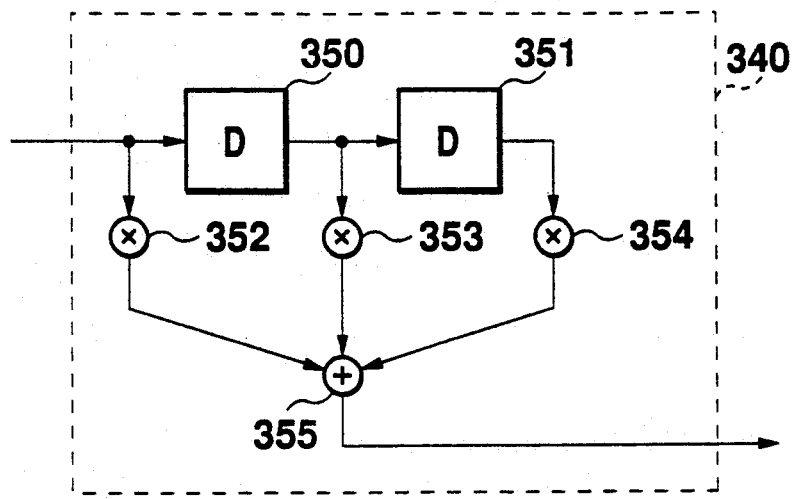
FIG. 7 is a circuit diagram of the low-pass filter of the fourth embodiment.
Figure 8:
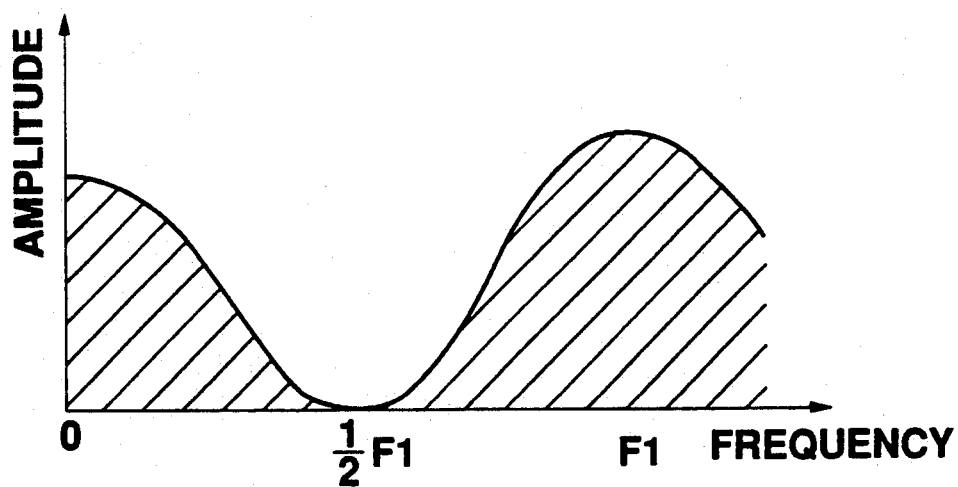
FIG. 8 shows the amplitude characteristic of the low-pass filter of the fourth embodiment.

FIG. 7 is a circuit diagram of the low-pass filter 340 of the color signal interpolator shown in FIG. 6. FIG. 8 shows the amplitude characteristic of a low-pass filter 340.

In FIG. 7, the low-pass filter 340 in this embodiment is composed of a delay circuit 350 for delaying an input signal by the time equivalent to the period T1, a delay circuit 351 for further delaying the delayed signal output from the delay circuit 350 by the time equivalent to the period T1, a first multiplier 352 for multiplying an input signal by ¼, a second multiplier 353 for multiplying the output signal of the delay circuit 350 by ½, a multiplier 354 for multiplying the output signal of the delay circuit 352 by ¼, and an adder 355 for adding the output signals of the first multiplier 352, the second multiplier 353 and the third multiplier 354.

The data interpolated between fields and output from the second selector 338 passes through the low-pass filter 340 having the above-described structure. The low-pass filter 340 completely cuts off the component having a period twice the period T of the data interpolated between fields. The amplitude characteristic of the output signal of the low-pass filter 340 is shown in FIG. 8. As is clear from FIG. 8, the frequency component in the vicinity of ½ of the frequency F is almost completely cutoff. Therefore, the vertical line disturbance component is removed from the output signal of the second selector 338. In this case, however, since the frequency component in the vicinity of the frequency F is also attenuated, it is necessary to compensate for this through the bandpass filter 341.

Figure 9:
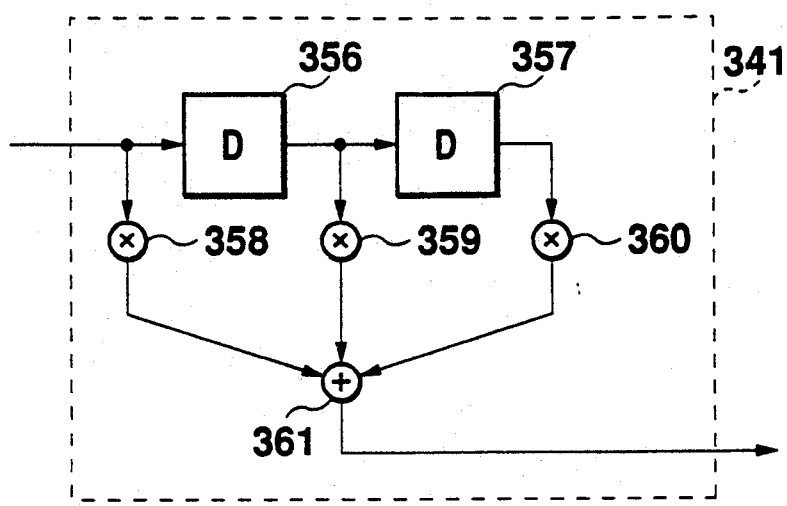
FIG. 9 is a circuit diagram of the bandpass filter of the fourth embodiment.
Figure 10:
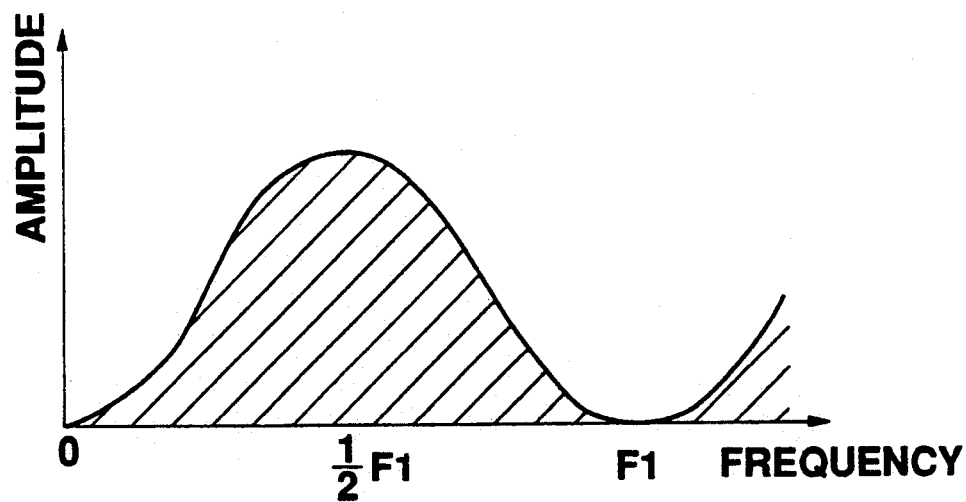
FIG. 10 shows the amplitude characteristic of the bandpass filter of the fourth embodiment.

FIG. 9 is a circuit diagram of the bandpass filter 341 of the color signal interpolator shown in FIG. 9. FIG. 10 shows the amplitude characteristic of the bandpass filter 341.

In FIG. 9, the bandpass filter 341 in this embodiment is composed of a delay circuit 356 for delaying an input signal by the time equivalent to the period T1, a delay circuit 357 for further delaying the delayed signal output from the delay circuit 356 by the time equivalent to T1, a fourth multiplier 358 for multiplying an input signal by ¼, a fifth multiplier 359 for multiplying the output signal of the delay circuit 356 by −½, a sixth multiplier 360 for multiplying the output signal of the delay circuit 357 by ¼, and an adder 361 for adding the output signals of the fourth multiplier 358, the fifth multiplier 359 and the sixth multiplier 360.

The input signal output from the low-pass filter 340 passes through the bandpass filter 341 having the above-described structure. The bandpass filter 341 extracts the frequency component in the vicinity of half of the frequency F. The amplitude characteristic of the output signal of the bandpass filter 341 is shown in FIG. 10. As is clear from FIG. 10, the output signal passes through the bandpass filter 341 and the frequency component in the vicinity of ½ of the frequency F, which has been attenuated by the low-pass filter 340, is extracted.

By adding the output signal of the bandpass filter 341 to the output signal of the low-pass filter 340, the signal obtained by completely cutting off only the frequency component having ½ of the frequency F from the output signal of the second selector 338 is output from the adder 342. It is thus possible to obtain a signal at the interfield interpolated data output terminal 339 which is free from vertical line disturbance due to the variation in the clamping level among fields.

As explained above, according to the color signal interpolator as the fourth embodiment of the present invention, since a color signal interpolated between fields is produced from the data interpolated between frames by passing the data interpolated between fields through the low-pass filter, further passing the output of the low-pass filter through the bandpass filter, and adding the output of the low-pass filter and the output of the bandpass filter, it is possible to remove the vertical line disturbance due to the variation in the clamping level between fields by a very simple structure, thereby producing a color signal having a good picture quality.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A video signal processor for reproducing a MUSE signal in the form of a Hi-vision signal comprising:
    (a) a time base expander for expanding the time bases of a digital brightness signal and two kinds of digital color difference signals transmitted with the time bases compressed on the transmission side to the original rate;
    (b) a color signal interpolator for converting the sampling rates of the two kinds of color difference signals with the time bases expanded by the time base expander to a predetermined multiple;
    (c) an inverse matrix circuit for calculating the two kinds of color difference signals output from the color signal interpolator and the brightness signal with the time base expanded by the time expander in the form of a matrix and outputting R, G, and B signals;

(d) a high-pass filter for extracting the high-frequency component of the brightness signal with the time base expanded by the time base expander;

(e) adders for adding an output of the high-pass filter to the brightness signal components of the R, G and B signals, with the time bases expanded;

(f) gamma corrector for imparting a gamma characteristic to respective outputs of the adders; and (g) a digital/analog converter for converting the R, G and B signals output from the gamma correctors to analog signals.

2. A video signal processor comprising:

(a) a high-pass filter for extracting a high-frequency component of a digital brightness signal transmitted with the time base compressed on the transmission side;

(b) a color signal interpolator for converting the sampling rates of two kinds of digital color difference signals with the time bases compressed on the transmission side to a predetermined multiple;

(c) an inverse matrix circuit for calculating two outputs from the color signal interpolator and the digital brightness signal in the form of a matrix and outputting R, G and B signals;

(d) adders for adding an output of the high-pass filter to the brightness signal components of the R, G and B signals;

(e) band-rejection filters for limiting bands of respective outputs of the adders;

(f) a gamma corrector for imparting a gamma characteristic to respective outputs of the band rejection filters;

(g) a time base expander for expanding time bases of outputs of the gamma correctors at the respectively predetermined rates;

(h) a digital/analog converter for converting outputs of the time base expander to analog signals; and (i) low-pass filters for extracting the respective low-frequency components from outputs of the digital/analog converter.

3. A video signal processor comprising:

(a) a time base expander for expanding time bases of a digital brightness signal and two kinds of digital color difference signals transmitted with the time bases compressed on the transmission side to an original rate;

(b) a color signal interpolator for converting sampling rates of the two kinds of color difference signals with the time bases expanded by the time base expander to a predetermined multiple;

(c) an inverse matrix circuit for calculating the two kinds of color difference signals output from the color signal interpolator and the brightness signal with the time base expanded by the time expander in the form of a matrix and outputting R, G, and B signals;

(d) a high-pass filter for extracting a high-frequency component of the brightness signal with the time base expanded by the time base expander;

(e) adders for adding an output of the high-pass filter to the brightness signal components of the R, G and B signals with the time bases expanded;

(f) band-rejection filters for limiting bands of respective outputs of the adders;

(g) a gamma corrector for imparting a gamma characteristic to respective outputs of the band-rejection filters;

(h) a digital/analog convertor for converting respective outputs of the gamma correctors to analog signals; and (i) low-pass filters for extracting respective low-frequency components from outputs of the digital/analog converter.

4. A video signal processor according to either of claims 2 and 3, wherein each of the band-rejection filters includes:

(a) first and second delay circuits connected in series with an input signal so as to delay the input signal by one clock pulse;

(b) a first multiplier for inputting the input signal branched from the signal which is input to the first delay circuit so as to multiply the input signal by $\frac{1}{4}$;

(c) a second multiplier for inputting the input signal branched from the signal which is delayed by the first delay circuit by one clock pulse and input to the second delay circuit so as to multiply the input signal by $\frac{1}{2}$;

(d) a third multiplier for inputting the signal which is delayed by the first delay circuit and further delayed by one clock pulse by the second delay circuit so as to multiply the input signal by $\frac{1}{4}$; and (e) an adder for adding the output signals of the first to third multipliers.

5. A color signal interpolator comprising:

(a) an inputting means for inputting line sequential color signals interpolated between frames as interframe interpolated data;

(b) a first delaying means for delaying the color signal output from the inputting means by the time which is equivalent to one field;

(c) a second delaying means for delaying the output of the first delaying means by the time which is equivalent to one line;

(d) a first selector means for taking out the output of the first delaying means and the output of the second delaying means alternately at a period of one field;

(e) a second selector means for taking out the interframe interpolated data output from the inputting means and the output of the first selector means alternately at a frequency F having a period equivalent to the half of the period of the interframe interpolated data;

(f) a low-pass filter means for removing the frequency component which is half of the frequency F of the output signal of the second selector means;

(g) a bandpass filter means for transmitting the frequencies of the outputs of the low-pass filter other than the frequency component having half of the frequency F;

(h) an adder for adding the outputs of the low-pass filter means and the bandpass filter means; and (i) an outputting means for outputting the output of the adder as a color signal converted into interfield interpolated data.

6. A color signal interpolator according to claim 5, wherein the low-pass filter includes:

(a) first and second delay circuits connected in series with an input signal so as to delay the input signal by the time equivalent to a period T1;

(b) a first multiplier for inputting the input signal branched from the signal which is input to the first delay circuit so as to multiply the input signal by ¼;

(c) a second multiplier for inputting the input signal branched from the signal which is input to the second delay circuit so as to multiply the input signal by ½;

(d) a third multiplier for inputting the signal which is delayed by the first delay circuit and further delayed by the time equivalent to the period T1 by the second delay circuit so as to multiply the input signal by ¼; and (e) an adder for adding the output signals of the first to third multipliers.

7. A color signal interpolator according to claim 5, wherein the bandpass filter includes:

(a) first and second delay circuits connected in series with an input signal so as to delay the input signal by the time equivalent to a period T1;

(b) a first multiplier for inputting the input signal branched from the signal which is input to the first delay circuit so as to multiply the input signal by ¼;

(c) a second multiplier for inputting the input signal branched from the signal which is input to the second delay circuit so as to multiply the input signal by ½;

(d) a third multiplier for inputting the signal which is delayed by the first delay circuit and further delayed by the time equivalent to the period T1 by the second delay circuit so as to multiply the input signal by ¼; and (e) an adder for adding the output signals of the first to third multipliers.

* * * * *